United States Patent
Green et al.

(10) Patent No.: US 6,882,140 B2
(45) Date of Patent: Apr. 19, 2005

(54) NETWORK CONNECTION SENSING ASSEMBLY

(75) Inventors: Michael Patrick Green, Mechanicsburg, PA (US); Sam Denovich, Harrisburg, PA (US); Paul John Pepe, Clemmons, NC (US); Ralph Sykes Martin, Mount Airy, NC (US); James Joseph Eberle, Jr., Hummelstown, PA (US); Sheldon Easton Muir, Greensboro, NC (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/458,540

(22) Filed: Jun. 10, 2003

(65) Prior Publication Data

US 2004/0251890 A1 Dec. 16, 2004

(51) Int. Cl.[7] .............................. G01R 31/02; H01R 9/26
(52) U.S. Cl. ..................... 324/158.1; 439/716; 361/823

(58) Field of Search ................................. 324/754–758, 324/761–762, 158.1; 439/49, 715–719, 907, 928; 361/823, 827

(56) References Cited

U.S. PATENT DOCUMENTS

| 5,312,270 A | | 5/1994 | Siemon et al. ............... 439/532 |
| 5,741,157 A | * | 4/1998 | O'Connor et al. ........... 439/532 |
| 6,302,699 B1 | * | 10/2001 | Conorich et al. ............. 439/49 |
| 6,340,317 B1 | * | 1/2002 | Lin ............................ 439/713 |
| 6,692,311 B1 | * | 2/2004 | Kamei et al. ................ 439/716 |

* cited by examiner

Primary Examiner—Minh N. Tang

(57) ABSTRACT

A network sensing assembly is provided that includes an interface configured to receive a plurality of patch cords and a sensor element positioned proximate the interface. A plurality of contacts establish electrical connection to the sensor element when the patch cords are connected to the interface. At least one conductive element is attached to one of the patch cords and the sensor element. The conductive element is configured to couple more than one of the plurality of contacts when one of the patch cords is connected to the interface.

28 Claims, 6 Drawing Sheets

NETWORK CONNECTION SENSING ASSEMBLY

BACKGROUND OF THE INVENTION

The present invention generally relates to sensor systems and more particularly relates to an assembly that senses electrical connections in a network.

In order to better operate large electronic networks, sensor systems have been developed to monitor connections between components within the network. The sensor systems typically are incorporated in the connections to interconnect modules on the network. The interconnect module allows connections between the two network components to be made by using a patch cord that is connected to another network resource. The sensor system commonly includes a spring-loaded pin on the receptacle or modular patch cord plug that is depressed and released when connections and disconnections are made. Spring-loaded pins, though frequently used for connection sensing, do not lend themselves well to interconnect module connection sensing due to alignment problems and space limitations.

Generally, the networks are structured with multiple locations corresponding to connection points where connections to the network can be made. These locations are convenient places for the installation of the interconnect modules. Consequently, monitoring of the network also tends to be done from these connection points. However, as the size of the network increases, or as more remote sites are added to the network, monitoring of the network becomes more cumbersome. This is particularly the case with rapidly expanding and changing data networks.

At a given site, practically all of the network cabling originates in a wiring closet which is the central distribution point for most of the network resources available at the site. Cable connections are made from the wiring closet to networked components, and as the network grows or changes, cabling changes are often required. In the wiring closet, cable terminations are typically made using wiring blocks, commonly known as "punch down" blocks, or other forms of patching devices. Network monitoring would be facilitated if physical connections to the network could be monitored in the wiring closet. Conventional sensor probe configurations, however, are incompatible with the punch down blocks that are commonly used in the wiring closet.

A need exists for a sensing assembly that can be used in sensing network connections made at the wiring blocks in wiring closets.

BRIEF DESCRIPTION OF THE INVENTION

In accordance with an exemplary embodiment of the invention, a network sensing assembly is provided that includes an interface configured to receive a plurality of patch cords and a sensor element positioned proximate said interface. A plurality of contacts establish electrical connection to the sensor element when the patch cords are connected to the interface. At least one conductive element is attached to one of the patch cords and the sensor element. The conductive element is configured to couple one or more of the plurality of contacts when one of the patch cords is connected to the interface.

Optionally, the sensing assembly includes a label holder that contains the sensor element and the conductive element extends on one side of at least one of the patch chords. Alternatively, the sensing assembly includes an interface extending along a bracket and the sensor element is contained in a holder having opposite side edges. A plurality of contacts are arranged in the holder along each side edge. In another version, the sensing assembly includes an interface having first and second rows of patch cord receptacles with the sensor element extending between the first and second rows. The sensor element is configured to establish electrical connections through the plurality of contacts to each patch cord connected to the first and second row of receptacles.

In accordance with another exemplary embodiment of the invention, a network sensing assembly is provided for a bracket having a connection interface adapted to receive a plurality of patch cords. The assembly includes a holder configured for removable engagement with a bracket, a sensor element within the holder, and a plurality of contacts extending from the holder to engage a patch cord connected to the interface. The assembly also includes at least one conductive element attached to one of the patch cords and the sensor element. The conductive element is configured to couple one or more of the plurality of contacts when one of the patch cords is connected to the interface.

DETAILED DESCRIPTION OF THE INVENTION

Figure 1:
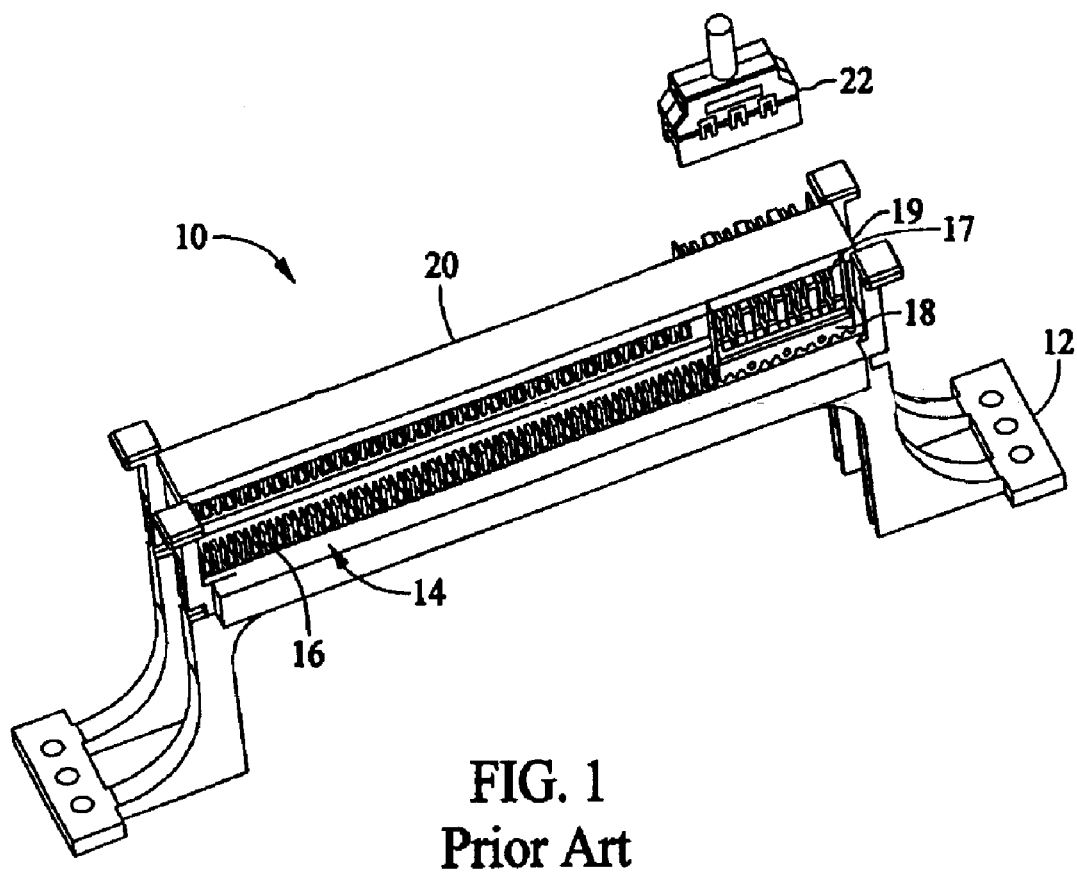
FIG. 1 illustrates a front perspective view of a wiring block used in a wiring closet.

FIG. 1 illustrates a wiring block or "punch down" block 10 that is commonly used in wiring closets. The wiring blocks 10 are modular and many will be found in the typical wiring closet. The wiring block includes feet 12 that are used to attach the wiring block 10 to a wall. The wiring block 10 also includes a lacing strip 14 having a row of wiring slots 16 for the attachment of signal wires 15 (see FIG. 3). The wiring block 10 also includes one or more cross-connect blocks 18 and a label holder 20. Cross connect blocks 18 are attached to the wiring block 10 as signal wire connections to the wiring block 10 are made. Cross connect blocks 18 define a connection interface 17 proximate an upper portion 19 of the wiring block 10. Connections to the wiring block 10 are made using a patch cord plug connector 22, which is also referred to simply as a patch cord plug or patch cord. The wiring blocks 10 are used in both voice and data communications, with the nature of the connection determining the number of signal wire pairs that are spanned by the connector 22. The standard wiring block 10 includes two rows of wiring slots 16 with each row accommodating twenty five pairs of signal wires. The patch cord plug connectors 22 are manufactured in varying sizes corresponding to the number of signal wire pairs in the connecting cable. The patch cord plug 22 is connected to the wiring block 10 by pushing the plug 22 downwardly over the connection interface 17 at the cross connect block 18.

The label holder 20 is generally a transparent plastic piece that snaps on to an upper portion 19 of the wiring block 10 proximate the connection interface 17. The label holder 20 covers a label (not shown in FIG. 1) that is provided for the convenience of technicians to record information relevant to the connections made on the particular wiring block 10. The label holder extends along the length of the wiring block 10 between the rows of wiring slots 16.

Figure 2:
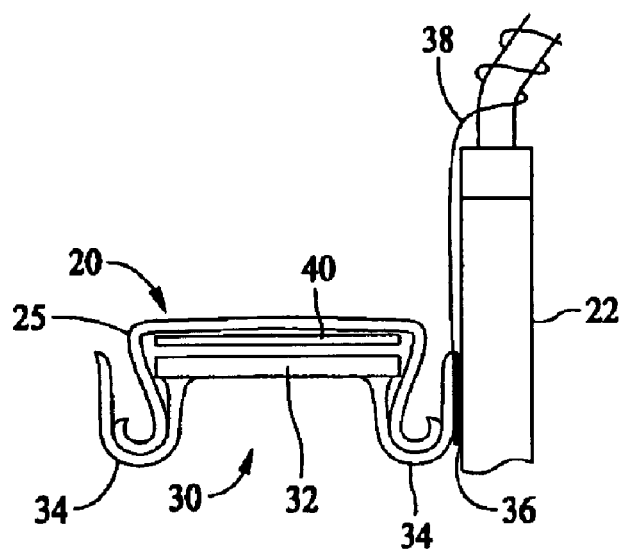
FIG. 2 illustrates an end view of a network connection sensing assembly in accordance with an embodiment of the present invention.

FIG. 2 illustrates an end view of a network connection sensing assembly 30 in accordance with one embodiment of the present invention. The assembly 30 is configured to fit within existing space in the label holder 20 (shown in FIG. 1). The assembly 30 includes a sensor element 32 that has a number of flexible contacts 34 that extend from the sensor element 32 and around side edges 25 of the label holder 20. The flexible contacts 34 are configured to make an electrical connection with a conductive element 36 of the patch cord plug 22 when the patch cord plug 22 is connected to the wiring block 10. In one embodiment, the flexible contacts 34 are U-shaped. As shown in FIG. 2, space remains within the label holder 20 for a label 40 if desired.

Figure 3:
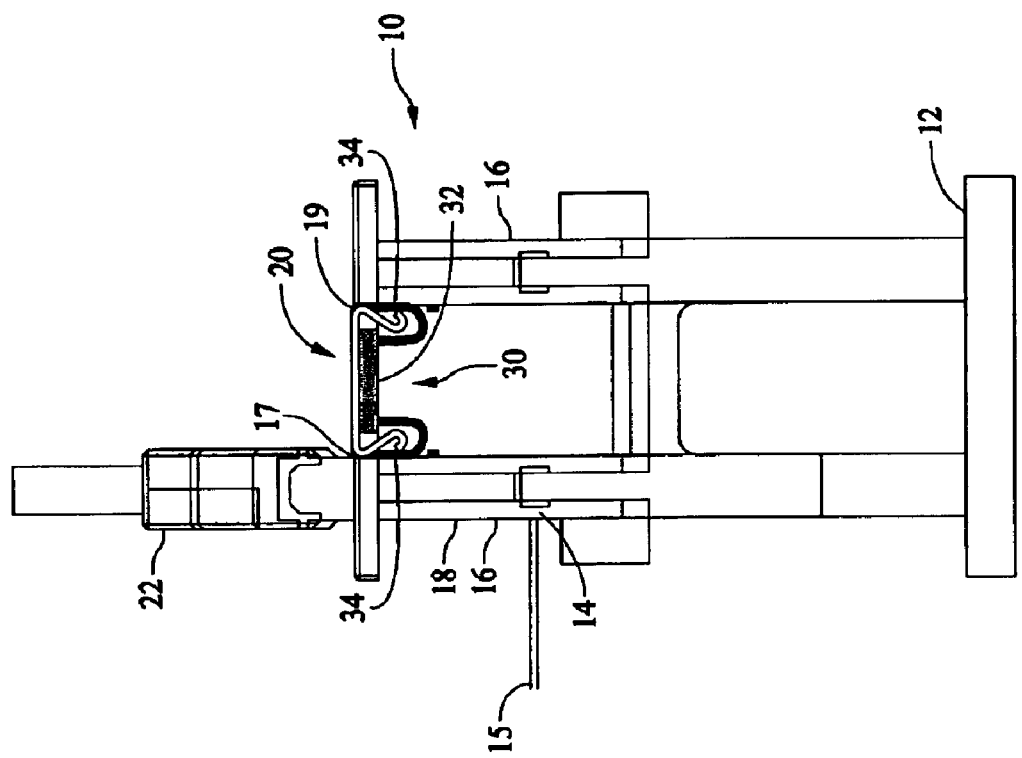
FIG. 3 is an end view of a wiring block with the sensing assembly of FIG. 2 attached.

FIG. 3 illustrates the sensing assembly 30 installed on a wiring block 10. The sensing assembly 30 is positioned between wiring slot rows 16 at an upper portion 19 of the wiring block 10. As positioned, the flexible contacts 34 of sensor element 32 are proximate the patch cord plug 22 when the patch cord plug 22 is connected to the wiring block 10 which facilitates sensing of the patch cord plug connections. Although the sensor element 32 is again shown positioned within the label holder 20, it should be noted that any manner of clip or holder could be used that positions the sensor element 32 proximate the patch cord plug connection interface 17. In addition, the flexible contacts 34 are not constrained to take a U-shape. Rather, the contacts 34 may take any shape that places a portion of the contact in a position to sense a connect or disconnect of a patch cord plug 22 with the wiring block 10.

Figure 4:
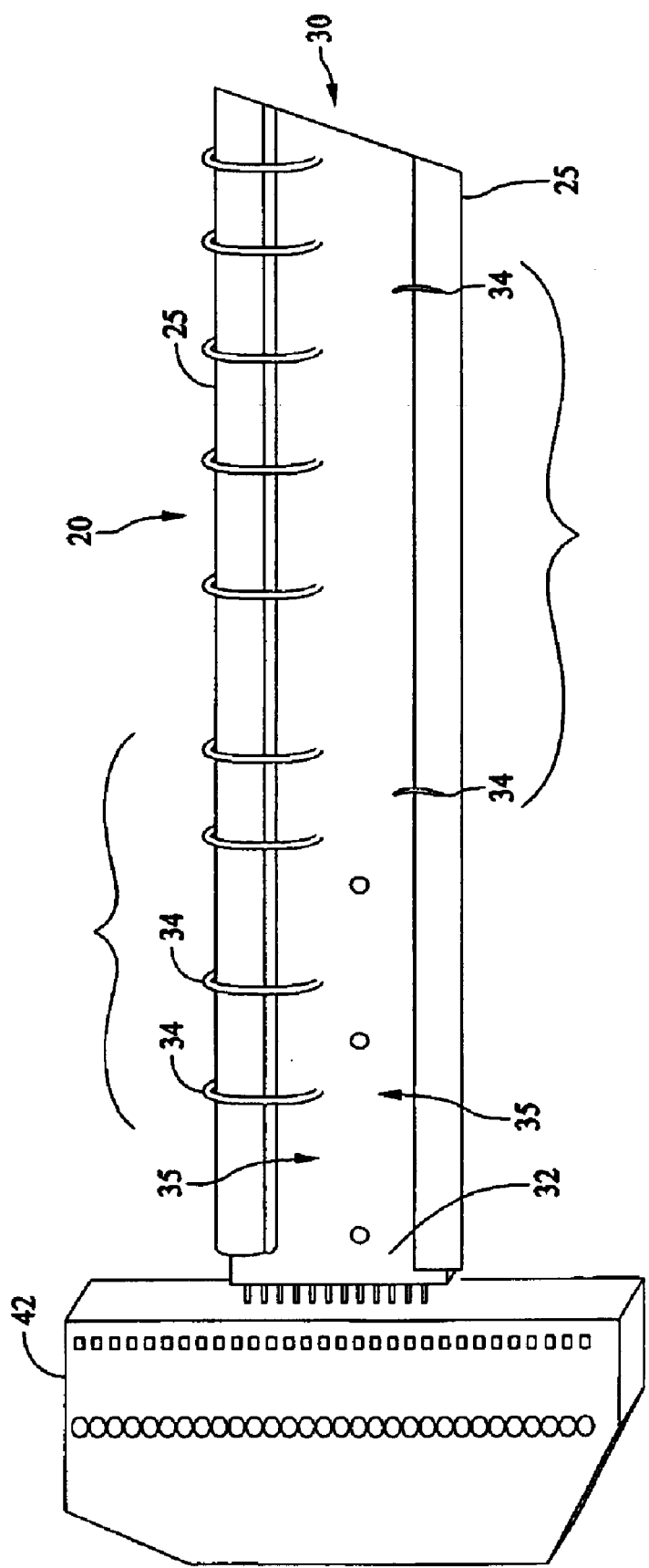
FIG. 4 illustrates a perspective bottom view connection sensing assembly in accordance with an embodiment of the present invention.

FIG. 4 is a bottom view of the sensing assembly 30 showing the sensing assembly 30 in greater detail. The sensor element 32 is removably inserted in the label holder 20. The sensor element 32 includes a number of flexible contacts 34 along side edges 35. The positioning and number of the flexible contacts 34 on the sensor element 32 reflects the type of connections that are anticipated to be made to the wiring block 10 (shown in FIG. 1) on which the sensing assembly 30 will be installed. It should be noted that the sensor element 32 includes contacts 34 along each side edge 35. The sensor element 32 is fitted with one flexible contact 34 for each connection that is anticipated to be made on the wiring block 10. Thus, the number of contacts 34 on a given sensor element 32 is variable from one wiring block 10 to another. Further, since each wiring block 10 contains two rows of wiring slots 16, each sensor element 32 contains two rows of contacts 34. The wiring configurations between the two rows can be different so that the arrangement of the contacts 34 on one side of a given sensor element 32 can be different from the arrangement of the contacts 34 on the other side of the sensor element 32. This condition is reflected in FIG. 3.

In one embodiment, the sensor element 32 is a printed circuit board. Alternatively, the sensor element 32 can be a flexible circuit. The sensor element can have multiple configurations to suit a customer's needs. The sensor element can accommodate the mixing of plug configurations and further, connections can be monitored to indicate the type of connection that is being made when a patch cord plug 22 is connected to the wiring block 10. Configurations can be changed simply by changing the sensor element circuit.

Signal wires 15 (see FIG. 3) terminate at the wiring block 10 (shown in FIG. 1) in pairs, and therefore, a connection at the wiring block 10 must be made with respect to a signal wire pair. The wiring blocks 10 are substantially standardized and typically include one or more rows of wiring slots 16 (shown in FIG. 1). If all the connections on a wiring block 10 are single pair connections, each side of the sensor element 32 would include one flexible contact 34 for each wiring pair in order to sense all the connections to the wiring block 10. Sensor element 32 includes a signal trace (not shown) for each contact 34. The signal traces for the contacts 34 extend along sensor element 32 culminating at an input/output (IO) connector 42 at one or both ends of sensor element 32.

With reference again to FIG. 2, when a connection is made at the wiring block 10, a conductive element 36 on the patch cord plug 22 makes an electrical connection with flexible contact 34. The conductive element 36 is connected to a separate wire 38, sometimes referred to as an "extra wire" that is part of a network connection monitoring system (not shown). The conductive element 36 may be a metal strip or the like attached to the patch cord plug 22 or a part of the plug itself. When contact is made between the flexible contact 34 and the conductive element 36, the network connection monitoring system receives an indication of a completed circuit through the IO connector 42 of sensor element 32. In an alternative embodiment, the locations of the conductive element 36 and the flexible contact 34 are reversed, that is, the conductive element 36 is on the sensor element 32 and the contact 34 is on the patch cord plug 22.

Figure 5:
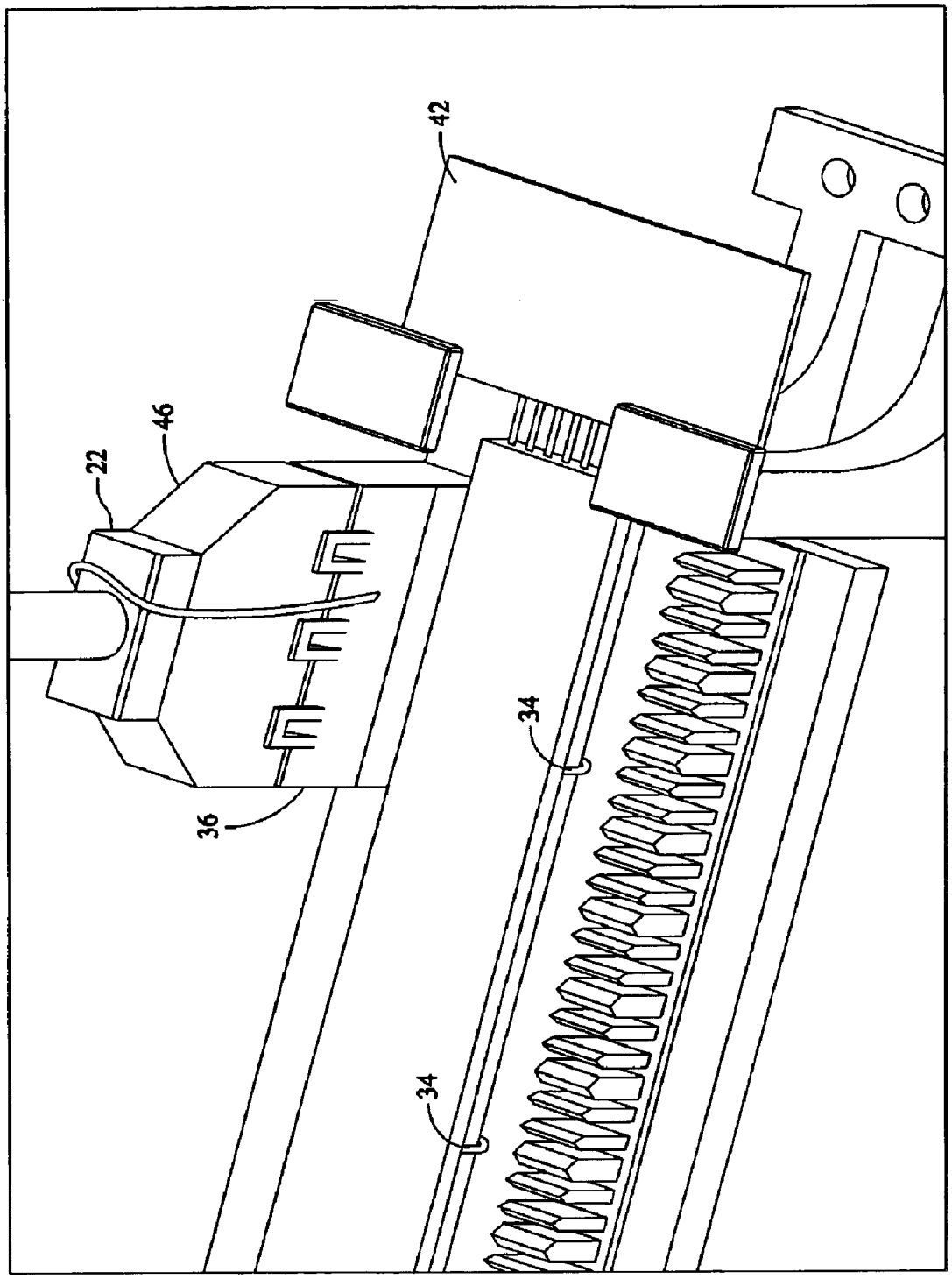
FIG. 5 illustrates a sensing assembly in accordance with an embodiment of the present invention installed on a wiring block.

FIG. 5 illustrates the connection sensing assembly 30 including a patch cord plug 22 installed on a wiring block 10. In FIG. 5, the patch cord plug 22 includes a conductive element 36 that is attached to the patch cord plug housing 46. Alternatively, the patch cord plug 22 may have a metal or metalized housing wherein the housing itself serves as the conductive element. Where the conductive element 36 is embodied in the patch cord plug housing 46, the sensor wire 38 is attached directly to the housing 46.

Although the sensor element 32 has been described as being insertable into the standard label holder 20 of wiring block 10, it is to be understood that the label holder 20 may be located elsewhere in the assembly. Rather, reference has been made to the optional use of the label holder 20 for the convenience of the user. It is only necessary that the sensor element 32 be held in position on the wiring block 10 in proximity to the patch cord plug 22. Furthermore, it is contemplated that more than one sensor element 32 may be used in practicing the invention. For instance, one sensor element 32 could be used for each row of terminal connections, that is, for each row of signal wire slots 16 on the wiring block 10.

In addition, the sensing assembly 30 has been described with reference to wiring blocks in a wiring closet. It is also to be understood the assembly 30 is not limited to use within wiring closets. Rather, the assembly 30 is intended for use with wiring blocks in any location.

Figure 6:
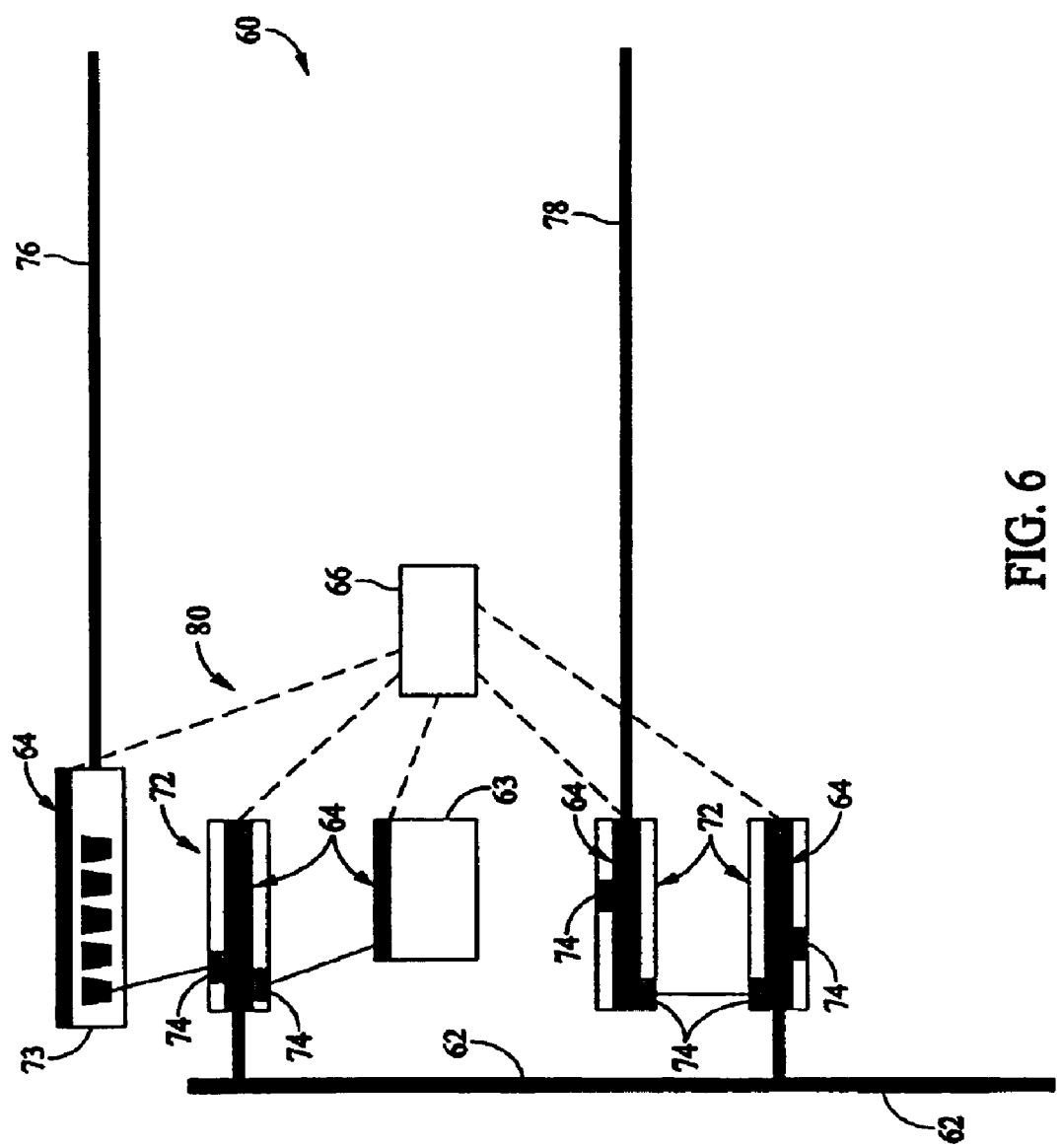
FIG. 6 is a block diagram of a network with a monitoring system.

FIG. 6 illustrates in block diagram form a network 60 equipped with connection sensing assemblies at 64. Outside data services and telecom services are represented at 62 and are accessible from the network 60 with internal distribution of data services represented at 76 and telecom services at 78. Local data is generally indicated at 63 and can include a variety of resources to which other network devices (not shown) can be connected. The connections are made using a wiring block 72 with patch cord connectors 74 which are structurally similar to patch cord connector 22, shown in FIG. 5. The network 60 may also include one or more rack or data panels 73, also equipped with a sensing assembly 64 to monitor connects and disconnects from the rack panels 73. Sensor signals from connects and disconnects are routed to a network analyzer 66 that includes network monitoring software.

In operation, the network monitoring system 80 controls the indications and notices given and the actions taken in response to events that occur on the network. To provide monitoring capability for the connections made to the wiring blocks 72 or rack panels 73, the sensing assembly 64 is installed on the wiring blocks 72 and rack panels 73 and each sensor element is connected to the network monitoring system 80 via the sensor element IO connector (shown in FIG. 5). The monitoring system 80 then monitors open circuit and closed circuit conditions that result when a patch cord plug conductive element, such as element 36 (shown in FIG. 5), makes or breaks contact with a flexible contact 34 (FIG. 5) on a sensor element 32 (shown in FIG. 4).

Figure 7:
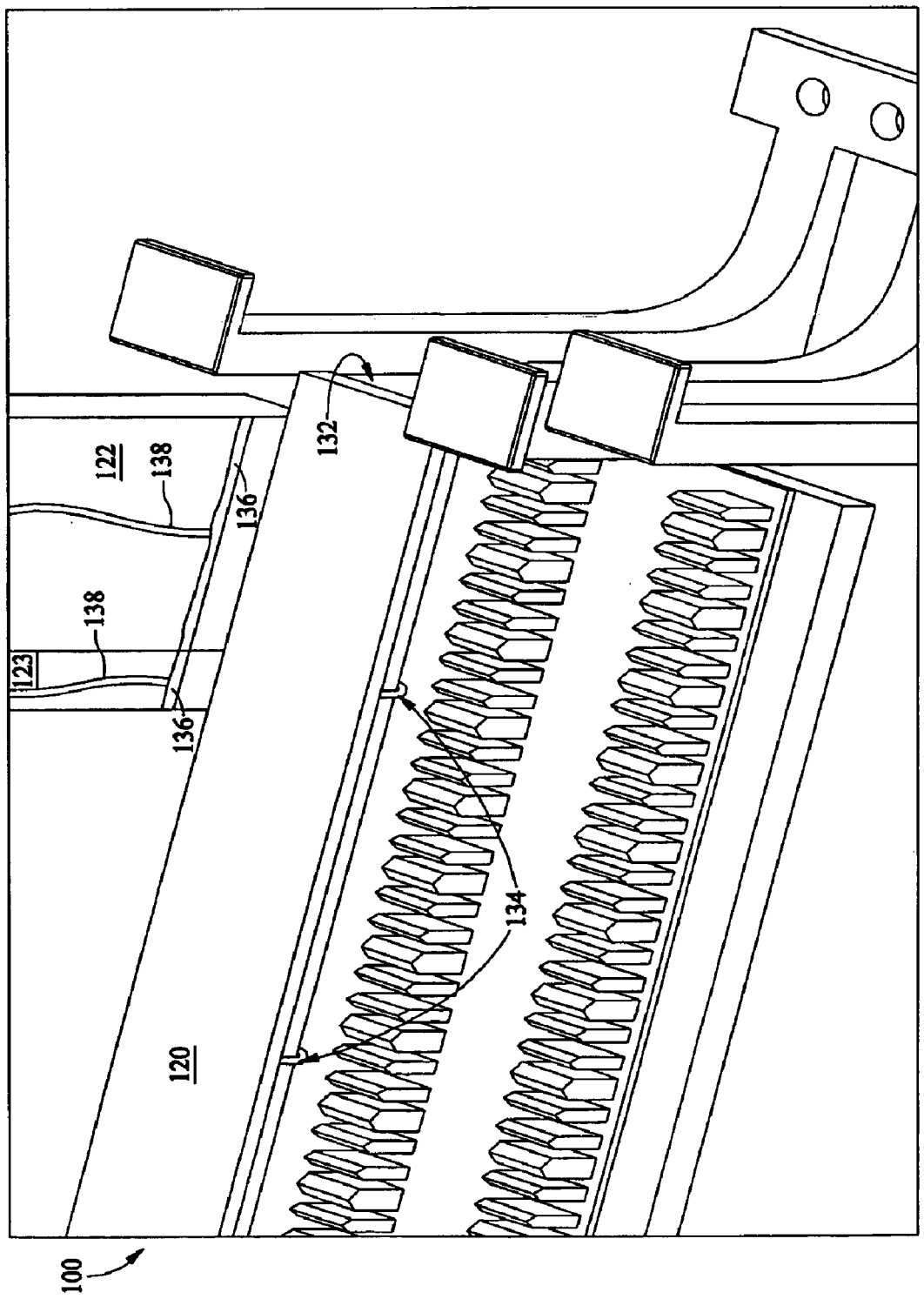
FIG. 7 illustrates a sensing assembly in accordance with another embodiment of the present invention installed on a wiring block.

FIG. 7 illustrates a wiring block 100 with different patch cord plug connectors 122 and 123 connected to the wiring block 100. The wiring block 100 includes a sensing assembly with a sensor element 132 below label holder 120 and contacts 134. Connector 122 is a four pair connector spanning four pairs of signal wires on the wiring block 100. Connector 123 is a single pair connector spanning only one pair of signal wires on the wiring block 100. Thus, the connectors are connected to different resources on the network. Connectors 122 and 123 each include conductive strips 136 and extra wires 138 such that their connections can be monitored.

The actions taken in response to the connection activity is dependent upon the level of sophistication of the network monitoring system 80. For instance, the monitoring system 80 may only report that a connection has been made or has been broken. At a higher level, and with an appropriately configured sensor element 132, the monitoring system 80 by sensing the number of wire pairs on a patch plug connector 122 or 123, can determine the type of connection being made, or that a connection has been changed from one type to another. Furthermore, the capability exists, again with an appropriate configuration, to allow the network manager to set up a connection scheme without advanced planning by merely plugging in a given type of connector and letting the monitoring system 80 indicate what type of connection has been established.

Thee embodiments thus described provide a network connection sensing assembly suitable for use in a wiring closet environment with network terminations made with standard wiring blocks. Connection sensing capability is thus provided in a centralized location and where the bulk of cabling changes are made. Further, the connection sensing assembly can be easily retrofitted to existing installations.

While the invention has been described in terms of various specific embodiments, those skilled in the art will recognize that the invention can be practiced with modification within the spirit and scope of the claims.

What is claimed is:

1. A network sensing assembly comprising:
   an interface configured to receive a plurality of patch cords;
   a sensor element positioned proximate said interface;
   a plurality of contacts establishing electrical connection to said sensor element when said patch cords are connected to said interface; and
   at least one conductive element attached to one of the patch cords and the sensor element, said conductive element being configured to couple one or more of said plurality of contacts when one of the patch cords is connected to the interface, and
   wherein said interface comprises a first row and a second row of patch cord receptacles, said sensor element extending between said first row and said second row of patch cord receptacles and configured to establish electrical connection through said plurality of contacts to each of said patch cords connected to said first row and said second row of patch cord receptacles.

2. The network sensing assembly of claim 1, further comprising a sensor holder extending across said interface, said sensor holder containing said sensor element.

3. The network sensing assembly of claim 1, further comprising a sensor holder, said sensor holder containing said sensor element, and said sensor holder comprising a label holder.

4. The network sensing of claim 1, wherein said conductive element extends on one side of at least one of the patch cords.

5. The network sensing assembly of claim 1, wherein said contacts extend from said sensor element.

6. The network sensing assembly of claim 1, wherein said contacts are flexible.

7. The network sensing assembly of claim 1, wherein said interface extends along a wiring block.

8. The network sensing assembly of claim 1, further comprising a sensor holder, said sensor element contained in said sensor holder, said contacts extending from said sensor element within said sensor holder.

9. The network sensing assembly of claim 1, further comprising a sensor holder including opposite side edges, said sensor element contained in said sensor holder, and said plurality of contacts arranged in said sensor holder along each of said opposite side edges.

10. The network sensing assembly of claim 1, wherein said plurality of contacts are U-shaped.

11. The network sensing assembly of claim 1, further comprising a sensor holder coupled to said interface, said sensor holder comprising opposite side edges, said contacts extending from each of said side edges.

12. A network sensing assembly for a wiring block having a connection interface adapted to receive a plurality of patch cords, said assembly comprising:
   a sensor holder configured for removable engagement with a wiring block;
   a sensor element within said sensor holder; and
   a plurality of contacts extending from said sensor holder to engage a patch cord connected to the interface.

13. The network sensing assembly of claim 12, wherein said sensor holder comprises a label holder, said label holder containing said sensor element.

14. The network sensing assembly of claim 12, further comprising at least one conductive element attached to one of the patch cords and the sensor element, said conductive element being configured to couple one or more of said plurality of contacts when one of the patch cords is connected to the interface.

15. The network sensing assembly of claim 12, wherein a conductive element extends on one side of the patch cords.

16. The network sensing assembly of claim 12, wherein said plurality of contacts extend from said sensor element within said sensor holder.

17. The network sensing assembly of claim 12, wherein said sensor holder includes opposite side edges, said plurality of contacts arranged in said sensor holder along each of said opposite side edges.

18. The network sensing assembly of claim 12, wherein said plurality of contacts are U-shaped.

19. The network sensing assembly of claim 12, wherein said sensor element comprises a pair of sensor elements, each said sensor element including contacts along one side edge.

20. A network sensing assembly comprising:
   an interface configured to receive a plurality of patch cords;
   a sensor element positioned proximate said interface;
   at least one conductive element attached to an outer surface of one of the patch cords and said sensor element; and a plurality of electrical contacts attached to the other of said sensor element and the patch cords, said conductive element being configured to couple one or more of said plurality of contacts, and each of said plurality of contacts configured to establish an electrical connection between the patch cords and a monitoring system when one of the patch cords is connected to said interface.

21. The network sensing assembly of claim 20, further comprising a sensor holder, said sensor holder containing said sensor element, and said sensor holder comprising a label holder.

22. The network sensing assembly of claim 20, wherein said sensor element comprises a first end, a second end opposite said first end, and an IO connector on at least one of said first end and said second end.

23. The network sensing assembly of claim 20, wherein said sensor element includes a predetermined number of contacts corresponding to a predetermined number of connections to the interface.

24. The network sensing assembly of claim 20, wherein said sensor element comprises a circuit board.

25. The network sensing assembly of claim 20, further comprising a sensor holder, said sensor element contained in said sensor holder, said contacts extending from said sensor element within said sensor holder.

26. The network sensing assembly of claim 20, further comprising a sensor holder including opposite side edges, said sensor element contained in said sensor holder, and said plurality of contacts arranged in said sensor holder along each of said opposite side edges.

27. The network sensing assembly of claim 20, further comprising a sensor holder coupled to said interface, said sensor holder comprising opposite side edges, said contacts extending from each of said side edges.

28. The network sensing assembly of claim 20, wherein said interface comprises first and second rows of patch cord receptacles, said sensor element extending between said first and second rows of patch cord receptacles and configured to establish electrical connection through said plurality of contacts to each of said patch cords connected to said first and second rows of patch cord receptacles.

* * * * *